United States Patent [19]
Tomita et al.

[11] Patent Number: 5,693,210
[45] Date of Patent: Dec. 2, 1997

[54] METHOD OF MANUFACTURING POROUS ALUMINA TUBE

[75] Inventors: Akira Tomita, Sendai; Takashi Kyotani, Natori; Yoshio Kobayashi, Sendai, all of Japan

[73] Assignee: President of Tohoku University, Sendai, Japan

[21] Appl. No.: 703,032

[22] Filed: Aug. 26, 1996

[30] Foreign Application Priority Data

Aug. 31, 1995 [JP] Japan .................... 7-245209

[51] Int. Cl.$^6$ .................. C25D 11/04; C25D 1/02; C25D 7/04
[52] U.S. Cl. .................. 205/324; 205/73; 205/151
[58] Field of Search .................. 205/73, 151, 324

[56] References Cited

U.S. PATENT DOCUMENTS 3,850,762  11/1974  Smith .......................... 205/324
4,859,288   8/1989  Furneaux et al. .............. 205/324
5,454,924  10/1995  Jansen et al. ................ 204/272

*Primary Examiner*—Kathryn L. Gorgos
*Assistant Examiner*—Edna Wong
*Attorney, Agent, or Firm*—Oblon, Spivak, McClelland, Maier & Neustadt, P.C.

[57] ABSTRACT

Disclosed is a method of manufacturing a porous alumina tube with numerous pores having a uniform shape and a uniform diameter of 5 to 200 nm and extending linearly in the vertical direction to the outer peripheral surface thereof, which comprises the steps of forming an anodized layer by anodizing the outer peripheral surface of an aluminum tube, and removing the aluminum tube after the anodized layer is formed.

9 Claims, 3 Drawing Sheets

METHOD OF MANUFACTURING POROUS ALUMINA TUBE

BACKGROUND OF THE INVENTION

1. Field of the Invention

The present invention relates to a method of manufacturing a porous alumina tube.

2. Description of the Related Art

A gas separation membrane can suppress energy consumption to an extremely low level since it accompanies no phase changes. If a catalytic function is added to the gas separation membrane, reaction and separation can be performed at the same time. In short, the membrane can be used as a membrane reactor.

Recently, various types of membranes have been developed. Commercially-available materials for separation membrane are representatively organic polymers and inorganic materials. When reaction is performed by use of the separation membrane, heat treatment is often accompanied. A separation membrane made of an inorganic material can be used at higher temperature than that made of an organic polymer. Hence, the inorganic material is suitable for use in the membrane reactor. However, the membrane made of an inorganic material lacks in flexibility. In the case where it is necessary to use the membrane in the form of a module, a tube form should be better than a flat-plate form, for practical purposes.

As the separation membrane made of an inorganic material, conventionally known is a porous alumina tube. To form the alumina tube, an α-alumina tube is first formed mainly from an α-alumina powder by molding, and then, the α-alumina tube is treated with heat or γ-alumina is coated on the surface of the α-alumina tube.

However, the alumina tube thus manufactured has problems in that the pores are not uniform in shape and the pore diameters have a wide distribution. To facilitate the control of selectivity in the gas separation, it is preferable that the alumina tube have pores uniform in shape and diameter.

SUMMARY OF THE INVENTION

The present invention provides a method of manufacturing, by an anodizing process, a porous alumina tube, with numerous pores having a uniform shape and diameter and extending vertically to the tube surface.

According to the present invention, there is provided a method of manufacturing a porous alumina tube comprising the steps of:

forming an anodized layer by anodizing the outer peripheral surface of an aluminum tube; and removing the aluminum tube after the anodized layer is formed, thereby obtaining the porous alumina tube formed of the anodizing layer.

DETAILED DESCRIPTION OF THE PREFERRED EMBODIMENTS

Hereinbelow, the method of manufacturing the porous alumina tube according to the present invention will be described with reference to the accompanying drawings.

(First step)

Figure 1:
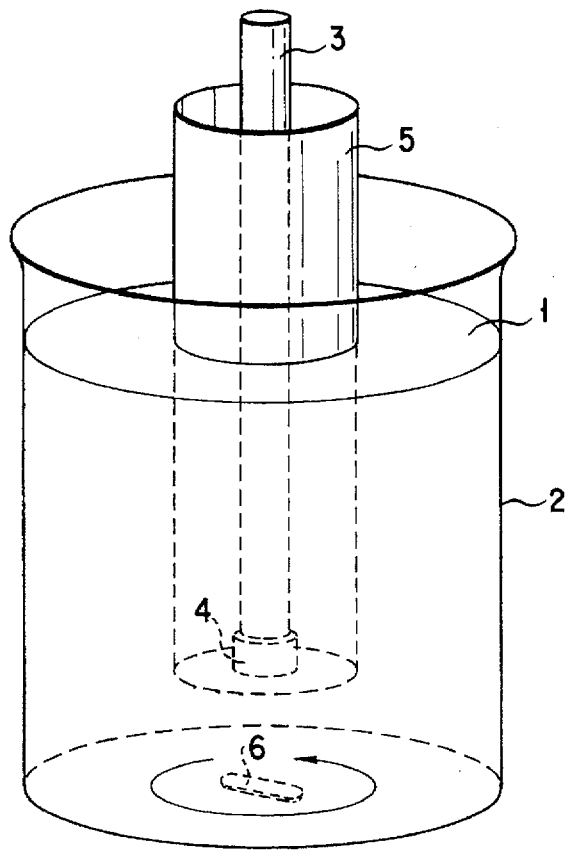
FIG. 1 is a schematic view of an anodizing apparatus for obtaining the porous alumina tube according to the present invention.
Figure 2:
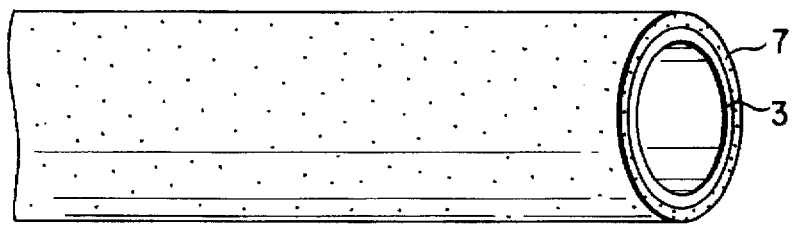
FIG. 2 is a perspective view showing a post-anodized state of an aluminum tube in the method of manufacturing the porous alumina tube according to the present invention.

FIG. 1 is a schematic view showing an anodizing apparatus. As shown in FIG. 1, an aluminum tube (Al tube) 3, which has previously been degreased and washed with water, is soaked in a vessel 2 containing an electrolyte 1. To the lower end portion of the aluminum tube 3, a cap 4 has been provided. The cap 4 prevents the electrolyte 1 from entering into the interior of the tube 3, thereby preventing the anodization of the interior. Subsequently, a cylindrical body 5 made of metal such as aluminum is soaked in the electrolyte 1 so as to surround the outer periphery of the aluminum tube 3 at a predetermined distance apart therefrom. Using the aluminum tube 3 with the cap 4 as an anode and the cylinder body 5 as a cathode, anodizing treatment is performed by applying a direct voltage of a predetermined value between the anode and cathode, while the electrolyte 1 is stirred by means of a magnetic stirrer 6 disposed on the bottom portion of the vessel 2. By the anodizing treatment, the outer peripheral surface of the aluminum tube 3 is exclusively anodized to form an anodized layer 7, as shown in FIG. 2.

The aluminum tube is preferred to have a purity of 99% or more.

As the electrolyte, for example, an oxalic acid solution having a predetermined concentration is used.

The cap is made of an insulating material such as a silicon rubber.

During the anodizing treatment, the thickness and quality of the anodized layer 7 formed on the outer peripheral surface of the aluminum tube 3, can be controlled by regulating a value of the current supplied from a direct-current generating apparatus connected to the anode and cathode.

The anodized layer preferably has a thickness of 1 to 2000 μm.

Incidentally, the aluminum tube may be treated with heat at a relative high temperature such as 500° C., prior to the anodizing treatment. By the heat treatment, it is possible to remove stress of the aluminum tube.

(Second step)

Figure 3:
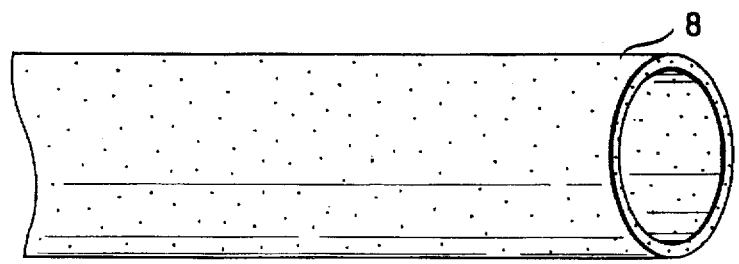
FIG. 3 is a perspective view of the porous alumina tube obtained by the method of the present invention.

The anodized aluminum tube with a cap, obtained in the first step is taken out of the electrolyte and then the cap is removed. After the aluminum tube is washed with distilled water or the like, an acidic solution is passed through the interior of the aluminum tube, thereby removing an aluminum portion left without being anodized. In the case where a barrier layer is formed on an interface between the anodized layer and the aluminum tube, the barrier layer is removed by further passing an acidic solution of another type through the interior of the tube formed of the anodized layer. By removing aluminum, if necessary, by removing aluminum and the barrier layer, the porous alumina tube 8 formed of an anodized layer, is manufactured, as shown in FIG. 3.

As the acidic solution for removing aluminum, an aqueous hydrochloric acid (HCl) solution having a desired concentration may be used.

As the acidic solution of another type for removing the barrier layer, a phosphoric acid solution such as an aqueous phosphoric acid ($H_3PO_4$) solution having a predetermined concentration may be used.

According to the present invention explained above, an anodized layer having numerous pores having a uniform shape and diameter (e.g., 5 to 200 nm) can be formed by anodizing the outer peripheral surface of an aluminum tube. After completion of the anodizing treatment, the aluminum tube is removed to thereby obtaining a porous alumina tube formed of the anodized layer, with good reproducibility.

Since the porous alumina tube thus obtained has numerous pores having a uniform shape and diameter, e.g., 5 to 200 nm and extending linearly in the vertical direction to the outer peripheral surface of the tube, the tube can be efficiently used as a gas separation tube, ultrafiltration tube, membrane reactor, and the like.

Hereinbelow, a preferable embodiment of the present invention will be described in detail with reference to FIGS. 1 to 3.

In a first place, as a starting material, prepared was an aluminum tube having a longness of 50 mm, a thickness of 0.2 mm, and outer diameter of 2 mm and having a purity of 99.5%. The stress of the tube was removed by heat treatment performed at 500° C. for 2 hours in the air.

Then, the aluminum tube was degreased with acetone and washed with water. Subsequently, the aluminum tube 3 was soaked in a vessel 2 containing an electrolyte 1 consisting of oxalic acid having a concentration of 4 wt %, as shown in FIG. 1. At the lower end of the tube 3, a silicon cap 4 has been previously provided. The silicon cap 4 plays a role of preventing the electrolyte 1 from entering into the interior of the tube, thereby preventing anodization of the interior. Thereafter, a cylindrical body 5 of 30 mm in diameter, made of aluminum was soaked in the electrolyte 1 so as to surround the outer periphery of the aluminum tube 3 at a predetermined distance apart. Connecting a direct current generating apparatus to the aluminum tube 3 serving as an anode and to the cylindrical body 5 serving as a cathode, the outer peripheral surface of the aluminum tube 3 was exclusively anodized while the electrolyte 1 is being stirred by a magnetic stirrer 6 disposed on the bottom portion of the vessel 2. As a result, an anodized layer 7 having a thickness of 250 μm was formed, as shown in FIG. 2. During the anodizing treatment, current was supplied at room temperature for 2 hours while the current density to the outer peripheral surface of the aluminum tube 3, was maintained at 20 mA/cm$^2$. During the anodizing treatment, the electric voltage was increased from 50V to 90V and thereafter it was applied at a constant level of 90V for 30 hours.

After the anodized layer 7 was formed on the outer periphery of the aluminum tube 3, the cap 4 was removed and the aluminum tube was washed with distilled water. Subsequently, an aqueous hydrochloric acid solution having a concentration of 10 wt % was passed through the interior of the aluminum tube to remove an aluminum portion left without being anodized. An aqueous phosphoric acid solution having a concentration of 4 wt % was further passed through the tube formed of the anodized layer to remove a barrier layer between the anodized layer and an aluminum tube. By removing the remaining aluminum and the barrier layer, the porous alumina tube formed of the anodized layer was finally obtained, as shown in FIG. 3.

Figure 4A:
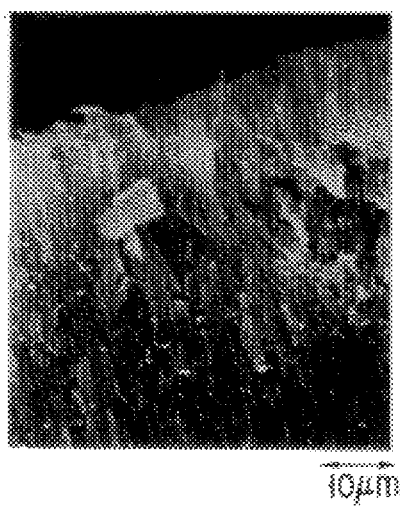
FIGS. 4A to 4E are SEM photographs of porous alumina tubes obtained in the embodiment of the present invention.
Figure 4B:
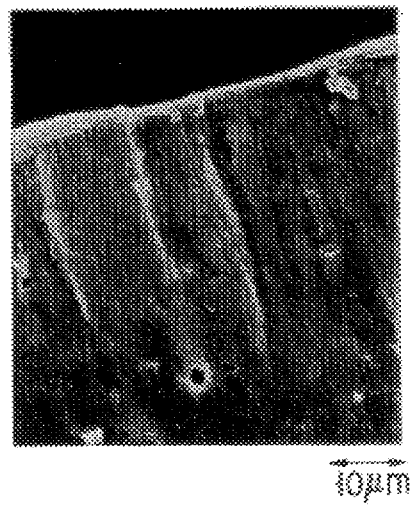
Figure 4C:
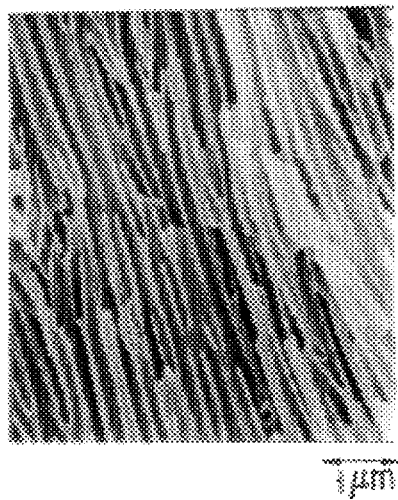
Figure 4D:
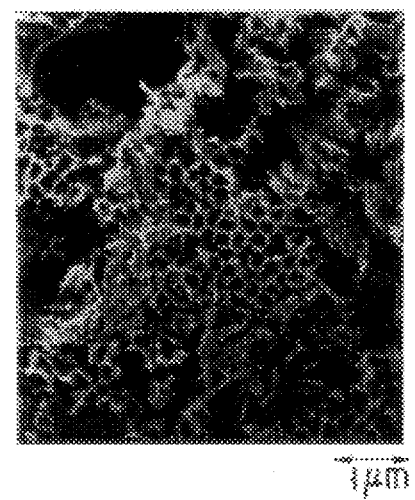
Figure 4E:

The porous alumina tube thus obtained was checked by a scanning electron microscope (SEM). The results are shown in FIGS. 4A to 4E. FIG. 4A is a cross sectional SEM photograph of the area near the outer surface of the porous alumina tube; FIG. 4B is a cross sectional SEM photograph of the area near the inner surface of the porous alumina tube; FIG. 4C is a cross sectional SEM photograph of the area near the middle portion of the porous alumina tube; FIG. 4D is an SEM photograph of the outside surface of the porous alumina tube; and FIG. 4E is an SEM photograph of the inside surface of the porous alumina tube.

As apparent from FIGS. 4A and 4D, the porous alumina tube obtained has an unsmooth and coarse outer surface, whereas it has a relatively smooth inner surface having cylindrical form pores of 150 nm in diameter, as shown in FIGS. 4B and 4E. Apparent from the cross-sectional shape of the alumina tube shown in FIG. 4C, numerous pores extend linearly in the vertical direction to the surface of the tube except for the portion near the surface.

Figure 5:
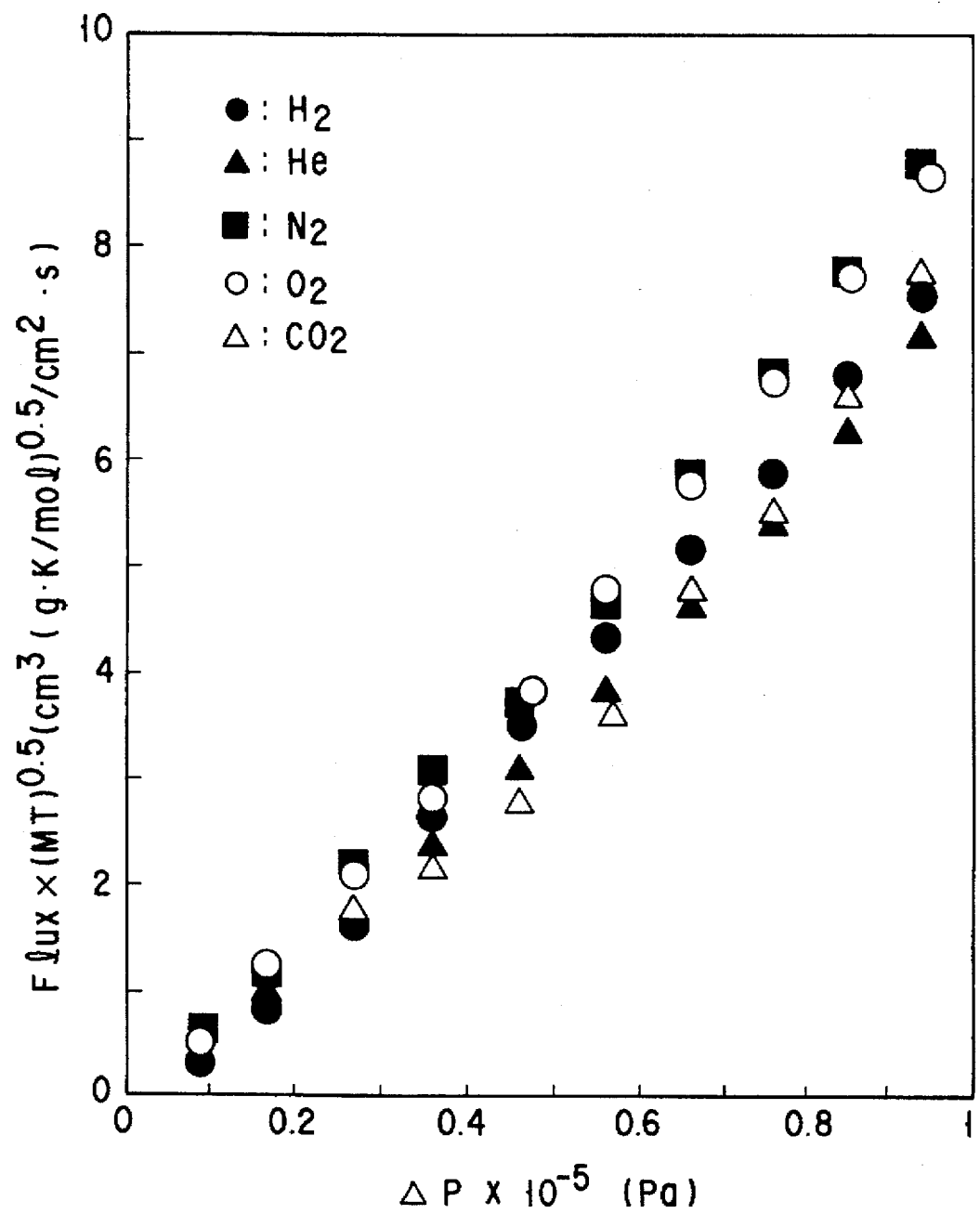
FIG. 5 is a characteristic diagram for explaining the permeability of various types of gases through a porous alumina tube obtained in the embodiment of the present invention.

The porous alumina tube obtained was checked for the permeability of various gases including hydrogen, helium, nitrogen, oxygen, and carbon dioxide gas. The results are shown in FIG. 5. In FIG. 5, the axis of ordinates indicates a flux×$(MT)^{0.5}$, in which M and T denote molecular weight and temperature, respectively. Plots indicating Gas pressure vs Flux relation exhibit a line having a constant gradient. Even if the molecular weight differs, no difference is observed in the relation. On the basis of these facts, it is conceivable that the permeation of gases is made depending upon the Knudsen flow and therefore demonstrated that the tube has no big cracks. No leakage was observed even if a pressure difference of 1 MPa is applied. Hence, it is demonstrated that the alumina tube can be used in separating gas and as a membrane reactor.

As explained in the foregoing, according to the present invention, there is provided a simple and good reproducible method of manufacturing, by an anodizing process, a porous alumina tube with numerous pores having a uniform shape and diameter and extending linearly in the vertical direction to the tube surface. The porous alumina tube is useful as a gas separation tube, ultrafiltration tube, membrane reactor and the like.

What is claimed is:

1. A method of manufacturing a porous alumina tube comprising the steps of:

soaking an aluminum tube with a capped end in an electrolyte;

further soaking a cylindrical body made of a metal in said electrolyte to surround the outer periphery of said aluminum tube at a preselected distance apart;

anodizing the outer peripheral surface of said aluminum tube by supplying current between said aluminum tube as an anode and said cylindrical body as a cathode to form an anodized layer; and removing the aluminum tube after said anodized layer is formed to obtain the porous tube formed of said anodized layer.

2. The method according to claim 1, wherein said anodized layer has numerous pores having a uniform diameter of 5 to 200 nm and extending linearly in the vertical direction to said outer peripheral surface.

3. The method according to claim 1, wherein said anodized layer has a thickness ranging from 1 to 2000 μm.

4. The method according to claim 1, wherein said electrolyte is an aqueous oxalic acid solution.

5. The method according to claim 1, wherein said cylindrical body is made of aluminum.

6. The method according to claim 1, wherein a removement of said aluminum tube after said anodized layer is formed, is performed by passing an acidic solution through the interior of said aluminum tube.

7. The method according to claim 6, wherein said acidic solution is an aqueous-hydrochloric acid solution.

8. The method according to claim 1, further comprising passing an acidic solution of another type through the interior of the tube formed of said anodized layer left after the removal of said aluminum tube, to remove a barrier layer formed on an interface between said aluminum tube and said anodized layer.

9. The method according to claim 8, wherein said acidic solution of another type is an aqueous phosphoric acid solution.

* * * * *